United States Patent [19]

Ozaki

[11] Patent Number: 5,608,489

[45] Date of Patent: Mar. 4, 1997

[54] EYE DIRECTION DETECTING DEVICE

[75] Inventor: Hiroyasu Ozaki, Tokyo, Japan

[73] Assignee: Asahi Kogaku Kogyo Kabushiki Kaisha, Tokyo, Japan

[21] Appl. No.: 653,392

[22] Filed: May 24, 1996

[30] Foreign Application Priority Data

May 29, 1995 [JP] Japan .................................... 7-153868

[51] Int. Cl.$^6$ .............................. G03B 13/02; A61B 3/10
[52] U.S. Cl. ............................................. 396/51; 351/210
[58] Field of Search ................................... 354/410, 219, 354/62; 351/210

[56] References Cited

U.S. PATENT DOCUMENTS 5,155,516  10/1992  Shindo ..................................... 354/219
5,327,191  7/1994  Shindo et al. ......................... 354/410 X

FOREIGN PATENT DOCUMENTS

1241511  9/1989  Japan .
6-86758  3/1994  Japan .
2273991  7/1994  United Kingdom .

*Primary Examiner*—W. B. Perkey
*Attorney, Agent, or Firm*—Greenblum & Bernstein P.L.C.

[57] ABSTRACT

An anamorphic lens system in an eye direction detection device, applied to an observing optical system, modifies illumination light from a light source to be parallel in a lateral direction of a user's eye positioned to look through the observing optical system, dispersed in a vertical direction of the position of the user's eye, and substantially centered on the position of the user's eye. The anamorphic lens system transmits the illumination light from the light source to an illumination light exit surface positioned away from the optical axis of the observing optical system, and the illumination light is projected toward the position of the user's eye from the illumination light exit surface to separate signals from the image of the eye and an image formed by eyeglasses, if worn. The illumination light exit surface is a rectangular window having a longitudinal side parallel to longitudinal side of a field of view of the observing optical system, and is positioned below the position of a user's eye.

33 Claims, 7 Drawing Sheets

EYE DIRECTION DETECTING DEVICE

BACKGROUND OF THE INVENTION

The present invention relates to an eye direction detecting device which is, for example, employed in a finder system of a camera, for detecting a direction to which a user's eye is directed within the finder, A conventional eye direction detecting device is disclosed in, for example, U.S. Pat. No. 5,327,191, corresponding to Japanese Laid-open Patent Publication No. HEI 2-5. The eye direction detecting device disclosed in these documents utilize a light projection system that projects illumination light along an optical axis of a finder system, as a parallel luminous flux, toward an eye of a user. The finder system has an eyepiece with a coaxial optical axis, a light receiving system with a light receiving element that outputs a signal corresponding to a light distribution of light reflected from the eye, and a calculation device that processes the output from the light receiving system to detect a direction of the eye.

In this conventional device, the light receiving system and the finder system have coincident optical axes, so that the eye direction of a user viewing a scene through the finder is detected. Furthermore, in this conventional device, the light projection system disclosed therein projects illumination light along the optical axis of the finder system, and illumination light enters the eye even when the eye is moved along the optical axis of the finder system.

In this conventional device, a portion of the emission light is regulated by the cornea, and forms a first Purkinje image on the light receiving element. A portion of the illumination light also reaches the retina through the pupil of the eye, and the reflected component of the light from the retina also forms an image on the light receiving element. The calculating device calculates the separation distance between the center of the pupil and the first Purkinje image using the light distribution from the light receiving element, and calculates an angular displacement of the user's eye eyeball using the above-mentioned separation distance and a predetermined distance between the center of the pupil and the center of curvature of the cornea.

However, according to this conventional eye direction detecting device, when a photographer wears eyeglasses, a strong reflection component from the eyeglasses interferes with the reflection components from the eyeball, and separation of the eyeglass component from the eye component is difficult. Accordingly, the detection of eye direction may be inaccurate or impossible.

Further, in the conventional device, the pupil center location is calculated using the component reflected by the retina. In this case, the strength of the retina-reflected component changes depending on the position of the eye and/or the ambient brightness, resulting in a lack of precision in the pupil center calculation and other calculations derived therefrom.

In an alternative known structure, the illumination light is provided by a source away from the optical axis of the finder system. In such a case, illumination light is emitted at a wide angle, so that sufficient light enters the eye even when the eye moves in the optical axis direction. Since the light source illuminates in a wide angle to all directions of the light projection system, only a small amount of the total light available enters the eye, and the remainder is not used. For example, when a light source is provided away from the optical axis of the finder at the lower side, a user's eye looking into the finder is positioned above the light source. Most of the illumination light is directed away from entering the eye, and is thereby wasted. A strong, and therefore large, light source, or multiple light sources, are therefore necessary to achieve a satisfactory signal strength from the sensor.

SUMMARY OF THE INVENTION

It is therefore an object of the present invention to provide an improved eye direction detecting device, capable of effectively utilizing the amount of available illumination light when the illumination light is projected from a point away from the light axis of the observing optical system.

In order to satisfy the objects, according to one aspect of the present invention, an eye direction detection device for an observing optical system includes: a light source; an anamorphic light projection optical system that anamorphically modifies illumination light from the light source and projects the anamorphically modified illumination light from a position away from an optical axis of the observing optical system; a light receiving device that receives reflected light from the eye and outputs a signal corresponding to the light distribution of the reflected light; and a calculation unit that determines the direction of the eye in response to the signal output by the light receiving device.

In this manner, the illumination light is projected from outside the optical axis of the observing optical system, and the pupil is detected as an actual image. Accordingly, stable eye direction detection is possible, as ray reflection components from eyeglasses, if worn, are formed at a position separated from the reflection components of the eye itself. Furthermore, as the illumination is anamorphically modified, all of the illumination light can be directed to the range of possible positions of the user's eye, and no light is wasted. This allows smaller, less power consumptive, or fewer light sources to be used in the eye detection direction device.

Preferably, the anamorphic light projection optical system projects the anamorphically modified illumination light from a lower eyelid side of the eye, and the anamorphic light projection optical system modifies the illumination light from the light source to be substantially parallel in a lateral direction of the eye, and to be dispersed toward the optical axis in a vertical direction of the eye.

Accordingly, the direction of the illumination light is defined by referring to the possible positions of the eye of the user, and can be controlled according to the principal detection direction of the light receiving system. The anamorphically modified light, having a predetermined width substantially parallel in the lateral direction, is projected to cover the range of the principal detection direction. Since the upper eyelid generally covers more of the eye than the lower eyelid, by projecting the illumination light from the lower side, the detection of the eye direction is improved.

In one particular development of this aspect of the invention, the anamorphic light projection optical system modifies the illumination light from the light source to be substantially parallel in a first direction, and to be dispersed toward the optical axis in a second direction perpendicular to the first direction, and the light receiving device detects an eye direction in the first direction within the observing optical system.

By anamorphically modifying the illumination light to be substantially parallel in the principal detecting direction of the light receiving system, the unevenness of the light reaching the light receiving system is reduced, and the accuracy is improved. Furthermore, since the modification of the illumination light to be parallel necessarily has a predetermined width across the light receiving system, the predetermined parallel width can be selected to use all of the light generated by the light source in the direction of detection, while dispersing the light in the direction perpendicular to the detection in order to allow for a range of possible eye positions.

In another particular development of this aspect of the invention, the anamorphic light projection system includes: an anamorphic light projection lens for modifying illumination light from a light source into illumination light parallel in a first direction and dispersed in a second direction perpendicular to the first direction; and an anamorphic light projection prism for reflecting the illumination light from the anamorphic light projection lens toward the optical axis of the observing optical system, and for modifying the illumination light from the anamorphic light projection lens into anamorphically modified illumination light dispersed in the first direction and parallel in the second direction.

The anamorphic light projection lens allows the light from the light source to be effectively transmitted from the light source by concentrating it in one direction, while dispersing it in a second direction to widen the beam. At the anamorphic light projection prism, the widened beam is made parallel in the first direction, and the concentrated light dispersed in the second direction. The two anamorphic elements allow the illumination light to be concentrated and shaped to the correct width before being anamorphically modified to the selected shape and coverage. Furthermore, the light is reflected by the anamorphic light projection prism to the optimum direction (that of the optical axis) in order that the illumination light is dispersed over a useful area.

In this case, the anamorphic light projection prism may include at least one Fresnel lens surface for modifying the illumination light from the anamorphic light projection lens. The use of a Fresnel lens surface allows the lens surface to be considerably thinner, so that the space in the vicinity of the eye direction detection device is effectively utilized.

According to still another development of this aspect of the invention, the anamorphic light projection system includes: a cylindrical lens for modifying illumination light from the light source into illumination light parallel in a first direction; and an anamorphic light projection prism for reflecting the illumination light from the cylindrical lens toward the optical axis of the observing optical system, and for modifying the illumination light from the cylindrical lens into anamorphically modified illumination light dispersed in the first direction and parallel in the second direction. Again, the cylindrical and anamorphic elements allow the illumination light to be concentrated and shaped to the correct width before being anamorphically modified to the selected shape and coverage, and to be reflected by the anamorphic light projection prism to the optimum direction in order that the illumination light is dispersed over a useful area.

In yet another development of this aspect of the invention, the anamorphic light projection system includes: an anamorphic light projection prism for redirecting the illumination light from the light source toward the optical axis of the observing optical system, and for modifying the illumination light from the light source into anamorphically modified illumination light dispersed in a first direction and parallel in a second direction perpendicular to the first direction. Again, the anamorphic light projection prism alone allows the illumination light to be concentrated and shaped to the correct width before being anamorphically modified to the selected shape and coverage, and to be reflected by the anamorphic light projection prism to the optimum direction in order that the illumination light is dispersed over a useful area. Preferably, the anamorphic light projection prism includes at least one Fresnel lens surface for modifying the illumination light from the light source. Further, an illumination light exit surface of the anamorphic light projection prism is angled to redirect illumination light from the light source toward the optical axis of the observing optical system. In this case, the illumination light exit surface may be a Fresnel lens surface.

According to another aspect of the present invention, a finder system for a camera includes: an observing optical system having an optical axis and an exit pupil at which an eye of a user is positioned when the user looks through the finder system; a light source; an anamorphic light projection optical system that anamorphically modifies illumination light from the light source and projects the anamorphically modified illumination light from a position away from the optical axis of the observing optical system toward the optical axis and toward the exit pupil; a light receiving device that receives reflected light from the eye and outputs a signal corresponding to the light distribution of the reflected light; and a calculation unit that determines the direction of the eye in response to the signal output by the light receiving device.

In this manner, the illumination light is projected from outside the optical axis of the observing optical system of the finder, and the pupil is detected as an actual image. Accordingly, stable eye direction detection within the finder field of view is possible, as ray reflection components from eyeglasses, if worn, are formed at a position separated from the reflection components of the eye itself. Furthermore, as the illumination is anamorphically modified, all of the illumination light can be directed to the range of possible positions of the user's eye with respect to the finder, and no light is wasted. This allows smaller, less power consumptive, or fewer light sources to be used in the eye detection direction device of the finder.

In one particular development of this aspect of the invention, the anamorphic light projection system includes: an anamorphic light projection lens for modifying illumination light from the light source into illumination light parallel in a first direction and dispersed in a second direction perpendicular to the first direction; and an anamorphic light projection prism for reflecting the illumination light from the anamorphic light projection lens toward the optical axis of the observing optical system, and for modifying the illumination light from the anamorphic light projection lens into anamorphically modified illumination light dispersed in the first direction and parallel in the second direction.

In another particular development of this aspect of the invention, the anamorphic light projection system includes: a cylindrical lens for modifying illumination light from the light source into illumination light parallel in a first direction; and an anamorphic light projection prism for reflecting the illumination light from the cylindrical lens toward the optical axis of the observing optical system, and for modifying the illumination light from the cylindrical lens into anamorphically modified illumination light dispersed in the first direction and parallel in the second direction.

According to still another development of this aspect of the invention, the anamorphic light projection system includes: an anamorphic light projection prism for redirecting the illumination light from the light source toward the optical axis of the observing optical system, and for modifying the illumination light from the light source into anamorphically modified illumination light dispersed in a first direction and parallel in a second direction perpendicular to the first direction. Preferably, an illumination light exit surface of the anamorphic light projection prism is angled to redirect illumination light from the light source toward the optical axis of the observing optical system. In this case, the illumination light exit surface may be a Fresnel lens surface.

In each of these aspects, the anamorphic element or elements allow the illumination light to be concentrated and shaped to the correct width before being anamorphically modified to the selected shape and coverage. Furthermore, the light is reflected by the anamorphic light projection prism to the optimum direction (that of the optical axis) in order that the illumination light is dispersed over a useful area. Each of the anamorphic light projection prisms may include at least one Fresnel lens surface for modifying the illumination light from the light source.

Preferably, the anamorphic light projection optical system modifies the illumination light dispersed toward the optical axis to be substantially centered on the exit pupil at which an eye of a user is positioned when the user looks through the finder system.

Consequently, the direction of the illumination light is defined by referring to the possible positions of the eye of the user at the exit pupil, and can be controlled according to the detection range of the light receiving system.

Further, the finder system further includes: a rectangular finder window through which a user looks, and the anamorphic light projection system projects the anamorphically modified illumination light from a lower side of the finder window. The anamorphic light projection optical system modifies the illumination light from the light source to be substantially parallel in a lateral direction of the eye, and to be dispersed toward the optical axis in a vertical direction of the eye.

By anamorphically modifying the illumination light to be substantially parallel in one direction of the light receiving system, the unevenness of the light reaching the light receiving system is reduced, and the accuracy is improved. The anamorphically modified light having a predetermined width substantially parallel in the lateral direction is projected to cover the detection range of the light receiving system. Furthermore, since the modification of the illumination light to be parallel necessarily has a predetermined width across the light receiving system, the predetermined parallel width can be selected to use all of the light generated by the light source in the direction of detection, while dispersing the light in a second direction in order to allow for a range of possible eye positions.

According to one particular modification, the anamorphic light projection system is provided with a rectangular light projection window having a longitudinal edge parallel to a longitudinal edge direction of the finder window, and the anamorphically modified illumination light is projected through the light projection window.

DETAILED DESCRIPTION OF THE PREFERRED EMBODIMENTS

Figure 1:
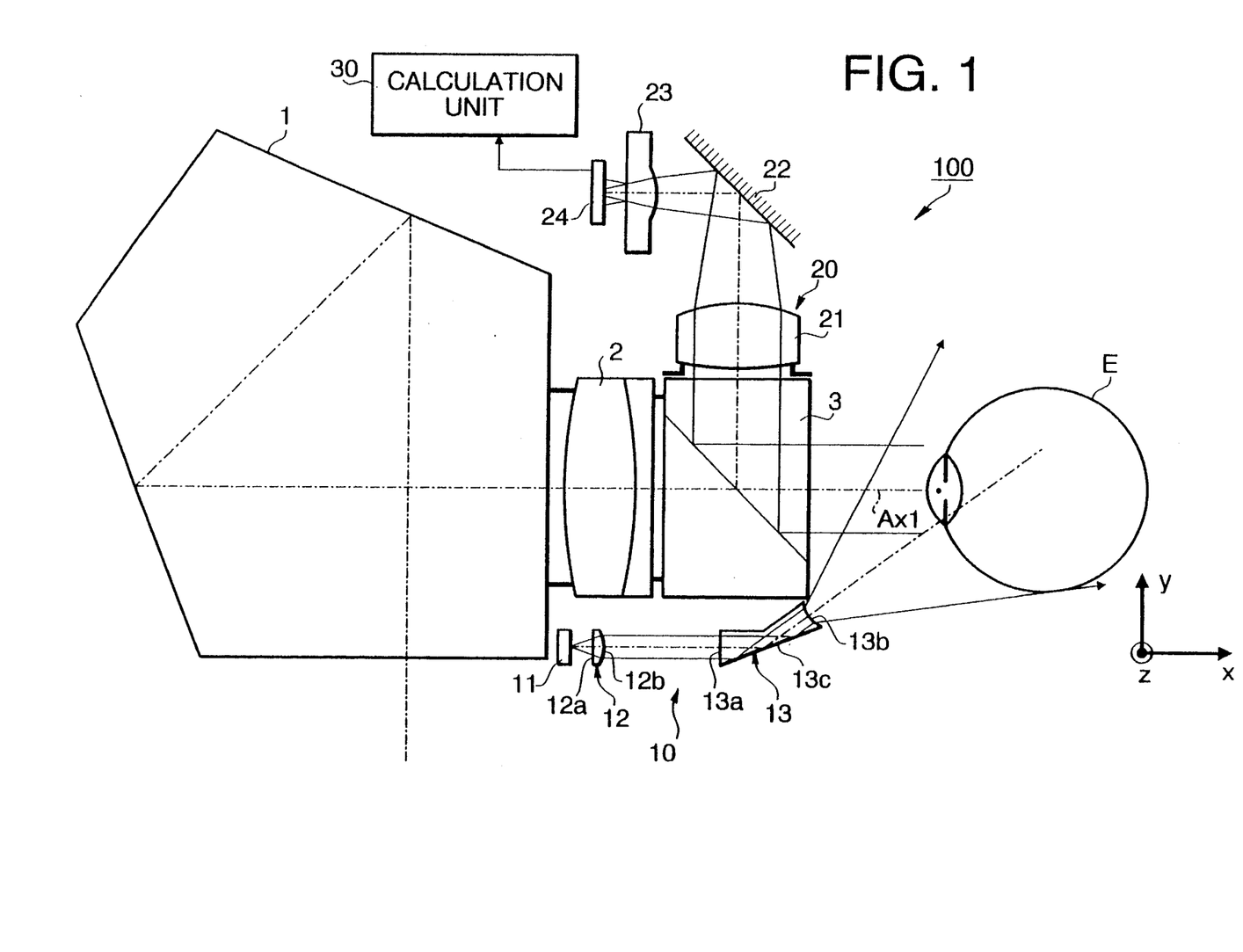
FIG. 1 is a side schematic view of camera finder, having a first embodiment of an eye direction detection device according to the invention applied thereto.
Figure 2:
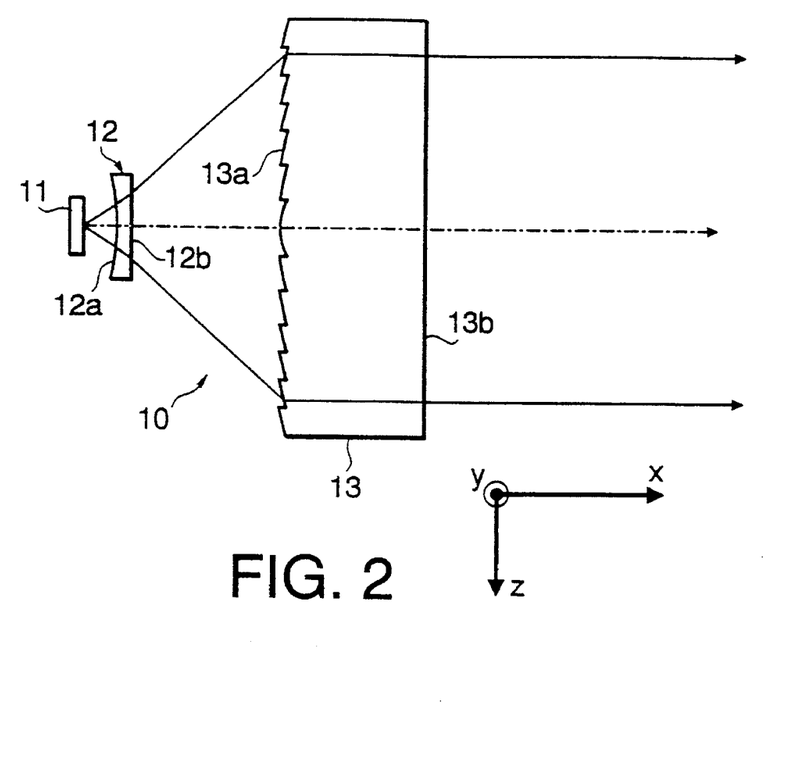
FIG. 2 is a top schematic view of the first embodiment of an eye direction detection device as shown in FIG. 1.

FIG. 1 shows the optical system of a finder 100 of a single lens reflex camera to which a first embodiment of an eye direction detecting device according to the invention is applied. Hereinafter, a reference orientation of the user's eye and the finder 100 is defined as a position where the user views the finder 100 (having a rectangular field of view) in a "landscape" position, with the longitudinal side of a rectangular finder window 101 (shown in FIG. 3) and of the finder field of view extending left to right, or laterally, from the user's view point. In this position, a coordinate system is defined where an X axis extends in the direction of the optical axis Ax1 of the finder 100 (normal to the plane of the finder 100 field of view), a Y axis extends up and down, or vertically, from the user's viewpoint (parallel to the shorter side of the finder 100 field of view), and a Z axis extends left and right, or laterally, from the user's viewpoint (parallel with the longer side of the finder 100 field of view, and perpendicular to the X-Y plane). This coordinate system, and corresponding "vertical" and "lateral" designations, are hereinafter used to describe the drawings and embodiments.

The light from an object to be photographed is reflected by a quick return mirror (not shown) after passing through a photographing lens (not shown) and enters a pentaprism 1. The light from an object to be photographed is reflected within the pentaprism 1, passes through an eyepiece lens 2, and a beam splitter 3 that partially reflects infrared (IR) light, and enters the user's eye E. The pentaprism 1, the eyepiece 2, and the beam splitter 3 constitute an observing optical system in the camera. Optical axis Ax1 of the finder 100 is designated as that of the observing optical system. A light projection system 10 of the first embodiment of an eye direction detecting device according to the invention is arranged below the eyepiece lens 2 and the beam splitter 3. The light projection system 10 projects anamorphically modified illumination light from a position away from the optical axis of the finder 100 toward the eye E of a user looking into the finder 100. A light receiving system 20 of the first embodiment of an eye direction detecting device according to the invention is provided above the beam splitter 3. The light receiving system outputs a signal corresponding to the light distribution of light reflected from the eye E and received by the light receiving system 20. The output signal of the light receiving system 20 is input into a calculation unit 30. The calculation unit 30 calculates the angular direction of the eye E of the user based on the received signal.

The light projection system 10 includes an infrared LED 11 as a light source, an anamorphic light projection lens 12 through which dispersed light generated by the LED 11 is passed, and an anamorphic light projection prism 13 that reflects the luminous flux from the light projection lens 12 toward the optical axis Ax1 side of the finder 100 system and toward the user's eye E. The light projection lens 12 includes an incident surface 12a and an exit surface 12b, while the light projection prism includes an incident surface 13a, an exit surface 13b, and an internal reflection surface 13c. The surfaces 12a, 12b of the light projection lens 12 and the surfaces 13a, 13b of the light projection prism 13 are each cylindrical surfaces having power in only one of the X-Y plane or X-Z plane. The negative and positive powers in the X-Y and X-Z planes of the surfaces 12a, 12b, 13a, and 13b, are shown in Table 1.

TABLE 1

| PLANE | PROJECTION LENS 12 | | PROJECTION PRISM 13 | |
|---|---|---|---|---|
| | INCIDENT SURFACE 12a | EXIT SURFACE 12b | INCIDENT SURFACE 13a | EXIT SURFACE 13b |
| X-Y | none | positive | none | negative |
| X-Z | negative | none | positive | none |

Thus, the light projecting lens 12 has a cylindrical surface on each of the incident and exit surfaces 12a, 12b, the respective generatrices of the incident end surface 12a and exit end surface 12b crossing each other at a right angle. The incident end surface 13A of the light projection prism 13 is a cylindrical lens surface of the Fresnel type, while the exit end surface of the light projection prism 13 is a cylindrical surface.

As shown in FIG. 1, the light projection lens 12 collects the dispersed IR luminous flux generated by the LED 11 and modifies the luminous flux into a beam substantially parallel within the X-Y plane (corresponding to a first direction) at the incident end surface 12a, but further dispersed within the X-Z plane (corresponding to a second direction perpendicular to the first direction) at the exit end surface 12b. The light projection prism 13 then collects the beam and modifies it into a beam parallel within both the X-Y and X-Z planes at the incident end surface 13a, reflects (i.e., redirects) the parallel beam toward the optical axis Ax1 of the finder 100 system at the reflection surface 13c, and modifies the parallel beam into a beam substantially parallel in the X-Z plane but dispersed in the X-Y plane and substantially centered on the user's eye E (that is, toward a position corresponding to the exit pupil of the observing optical system) at the exit end surface 13b. In combination, the anamorphic light projection lens 12 and anamorphic light projection prism 13 (while individually anamorphically modifying incident light) constitute an anamorphic light projection optical system that anamorphically modifies light passing through both.

The light receiving system 20 includes a condenser 21, a mirror 22, an image forming lens 23, and an area sensor (CCD) 24. The light from the eye E, reflected by the beam splitter 3, is collected by the condenser lens 21, reflected by the mirror 22, and is thereafter imaged on the CCD 24 by the image forming lens 23. The CCD 24 and the pupil of the eye E are at conjugate positions with respect to the light receiving system 20. As noted above, the CCD 24 is an area sensor, having picture elements arranged in two dimensions. Alternatively, if the eye direction is only detected in one dimension (i.e., only left to right, but not up and down; or vice versa), a line sensor having linearly aligned elements may be employed.

Figure 3:
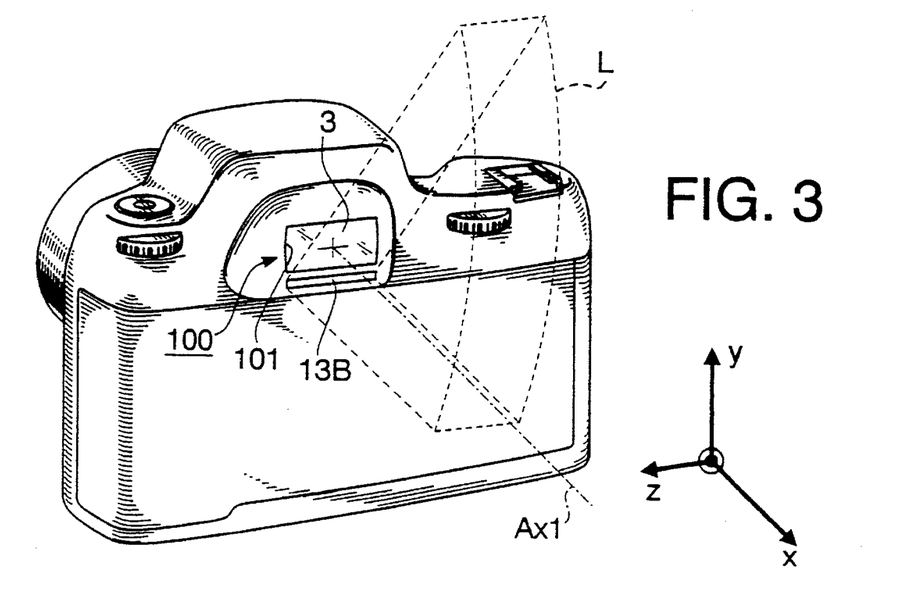
FIG. 3 is a perspective view of the rear of a camera having a finder to which the first embodiment is applied, and showing a light projection range of illumination light.

As shown in FIG. 3, the illumination light exit end surface 13b of the light projection prism 13, is exposed to the exterior of the camera adjacent the lower side of the rectangular finder window 101 through which a user looks, and is a rectangular light projection window having a longitudinal edge parallel to the longitudinal edge direction of the finder window 101 and finder 100 field of view. That is, the exit end surface 13b (i.e., the rectangular light projection window) projects the anamorphically modified illumination light from the lower side of the finder window 101, which corresponds to a lower eyelid side of the eye of a user looking through the finder 100. The arrangement of the finder window 101 and the rectangular light projection window shown in FIG. 3 is applicable to all of the embodiments of the invention.

A light projection range L of the anamorphically modified illumination light (parallel in the X-Z plane, dispersed in the X-Y plane, and centered on the user's eye E) projected by the light projection system 10 is shown in FIG. 3 by a phantom line. The illumination light is projected from the lower side of the finder 100 window when the camera is held upright, as shown (i.e., in the reference orientation), and has a predetermined width along the Z coordinate direction and is dispersed along in the Y coordinate direction, while directed toward the optical axis Ax1 of the finder 100 system.

Figure 4:
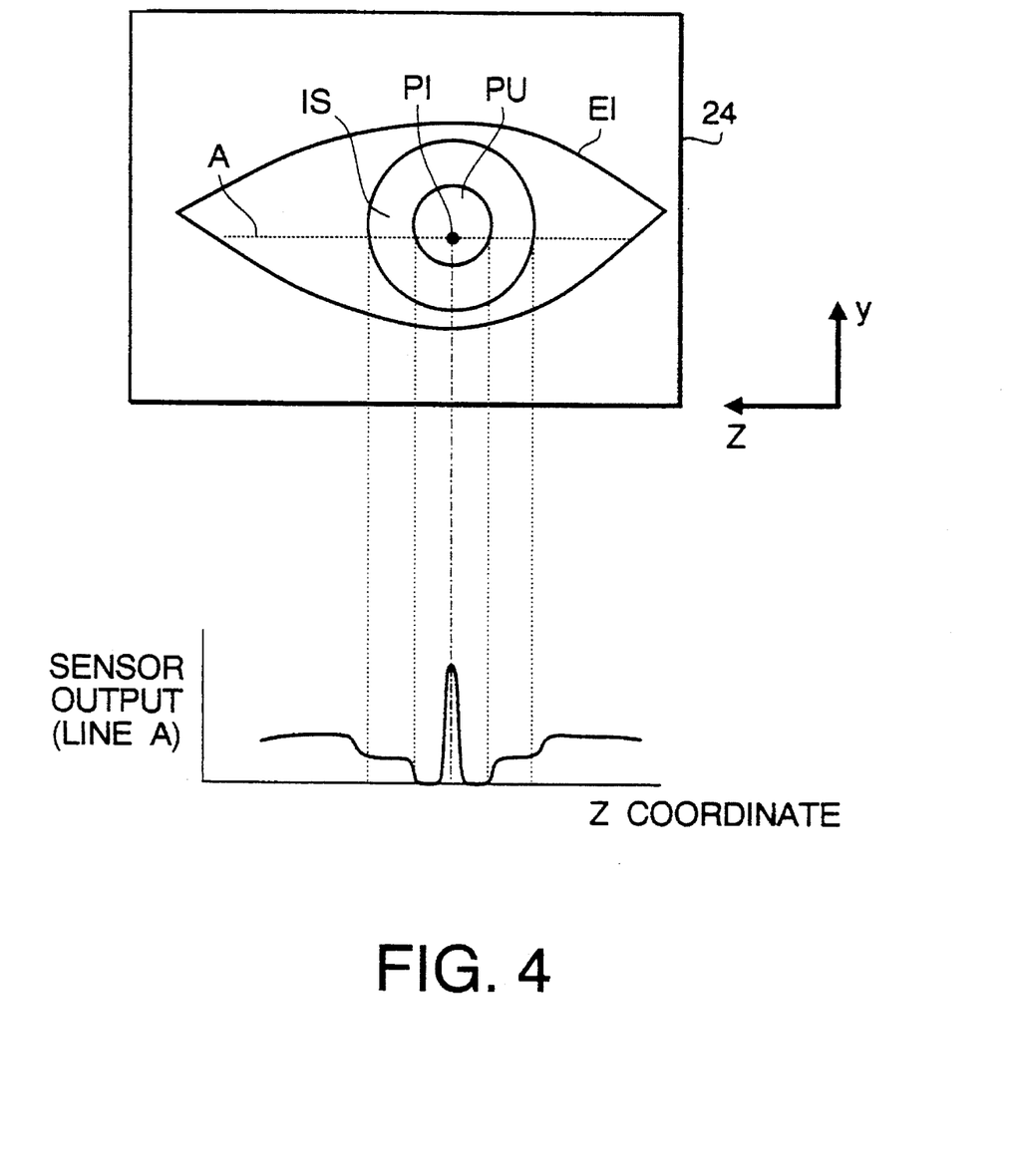
FIG. 4 is a chart showing the output of a sensor with respect to received light from a Purkinje image in the eye of a user.

An eye image EI (of the eye E) is formed on the CCD sensor 24, as shown in the upper portion of FIG. 4. For example, if the naked eye (without eyeglasses) is used, the darker center portion of the image is formed by the iris IS and the pupil PU. The first Purkinje image PI is formed by the specular reflection component from the cornea of the eye E, and is positioned within the pupil PU. An example line A through the first Purkinje image Pi is indicated by a broken line on the CCD sensor 24. The signal output (measuring brightness) of the picture element row along the example line A is shown at the lower portion of FIG. 4. The signal generated by the image sensor along the example line A is such that the brightness decreases in a stepwise fashion from the white eye portion (the sclera) to the iris IS, and then again to the pupil PU. At the first Purkinje image PI, an abrupt peak is formed, significantly brighter than the white eye portion.

Since the illumination light is projected from a position away from the optical axis of the finder 100, the pupil is detected as an actual image (pupil image PI). In comparison to methods where the pupil is detected based upon light reflected from the retina, variations in the strength of the reflected components (caused by changes in the position of the eye E, or caused by variations in ambient brightness) are small for the off-axis light projection. Accordingly, with this system, unevenness in the detected results are minimized.

In an example case, when only the eye direction in the Z coordinate direction within the finder 100 field of view is desired, the calculating unit 30 determines the distance along the Z coordinate from the pupil center to the first Purkinje image PI based upon a signal such as that shown in the lower portion of FIG. 4. Based upon the Z coordinate distance and a predetermined, preset distance between the pupil center to the center of the curvature of the cornea, the angular displacement of the eye E is obtained by a method detailed in the aforementioned U.S. Pat. No. 5,327,191. Accordingly, from the angular displacement of the eye E, the calculation unit 30 (or a control unit of the camera) determines the direction to which the eye of the user is looking within the finder 100 field of view.

when a plurality of discrete target zones along the Z coordinate direction of the finder 100 are defined, it can be determined what target zone the user is looking at based upon the obtained coordinate. Accordingly, information can be input into the camera by the eye direction detection system. For example, in a camera having a plurality of focus detection areas, the user can select a focus detection area near the object to be photographed by looking at that area, and the camera can appropriately focus the lens based on the detection of eye direction. In another example, in a camera having a plurality of photographing modes, mode changes can be performed by looking at predetermined areas within the finder 100.

In a case where the user wears eyeglasses, if illumination light were to be incident from the optical axis Ax1 of the finder 100 system (a situation not depicted in FIG. 5), reflection components from the eyeglasses and from the eye would form images in the central area and overlapping each other, making it difficult to detect the eye direction.

Figure 5:
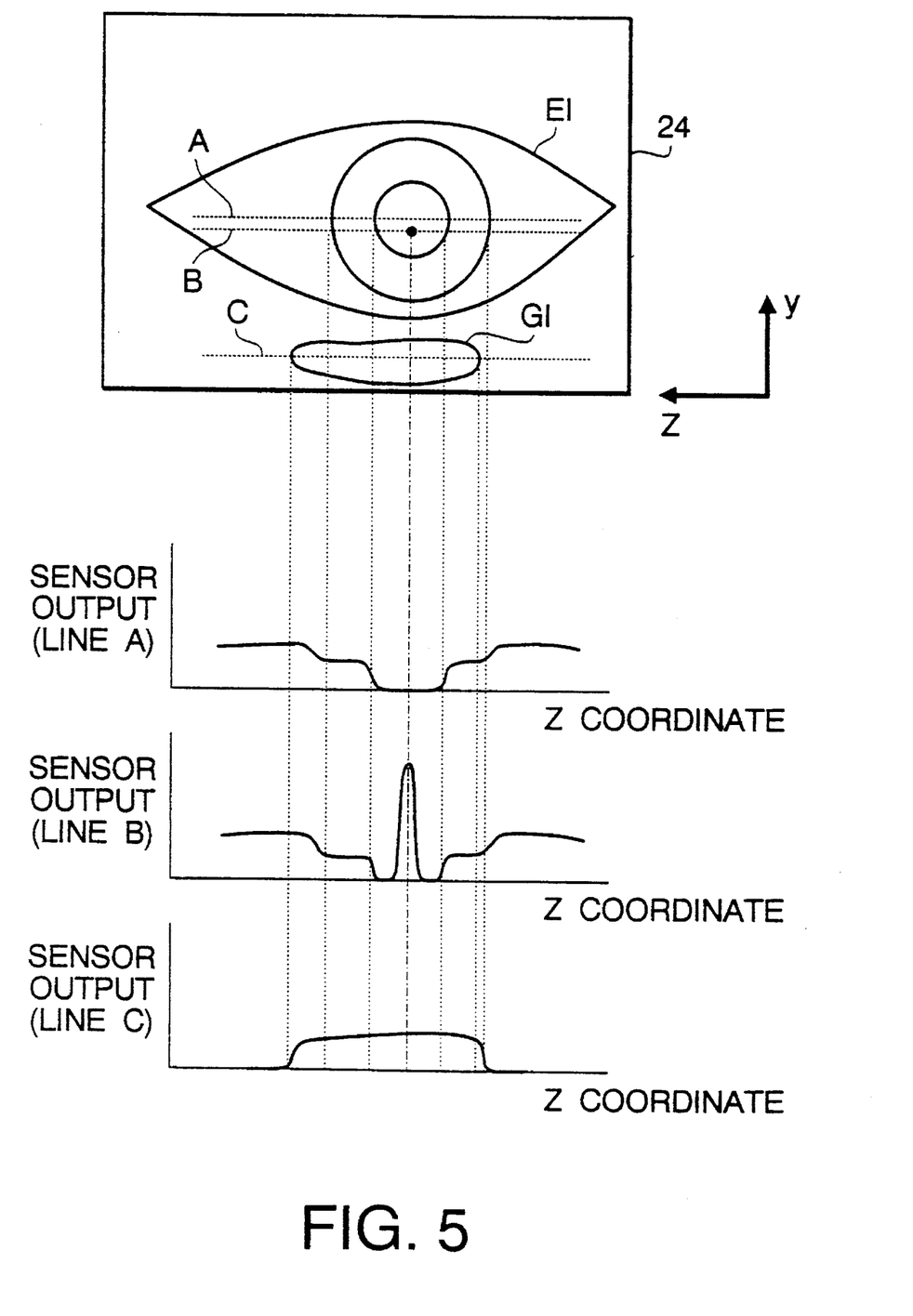
FIG. 5 is a chart showing the output of a sensor with respect to received light from a Purkinje image in the eye of a user wearing eyeglasses.

FIG. 5 is a chart showing an eye image EI (of the eye E) formed on the CCD sensor 24 and associated signals when the user wears eyeglasses when employing one of the embodiments of an eye detection direction device according to the invention. As shown in the upper portion of FIG. 5, although the images of the pupil PU, iris IS, and other portions are produced as shown in FIG. 4 (representing the naked eye), when eyeglasses are worn, a reflection component GI from the eyeglasses is also formed. The lower portion of FIG. 5 shows the signal output (measuring brightness) of the picture element rows along three example lines A, B, and C, each shown by a broken line on the CCD sensor 24. Line A is substantially at the position described for the naked eye, line B is taken through the first Purkinje image PI (shifted by the eyeglasses), and line C is taken through the reflection component GI from the eyeglasses. As shown in FIG. 5, as the illumination light is directed toward the user's eye from a position outside the optical axis Ax1 of the finder 100 system, the reflection component of the eyeglasses and the reflection component of the eye form the images GI and EI at the positions which do not interfere or intersect each other. Accordingly, by using the output of the picture element row along the line B through the first. Purkinje image PI, the eye direction in the Z coordinate direction of a user wearing eyeglasses can be as easily obtained as with the naked eye.

Figure 6A:
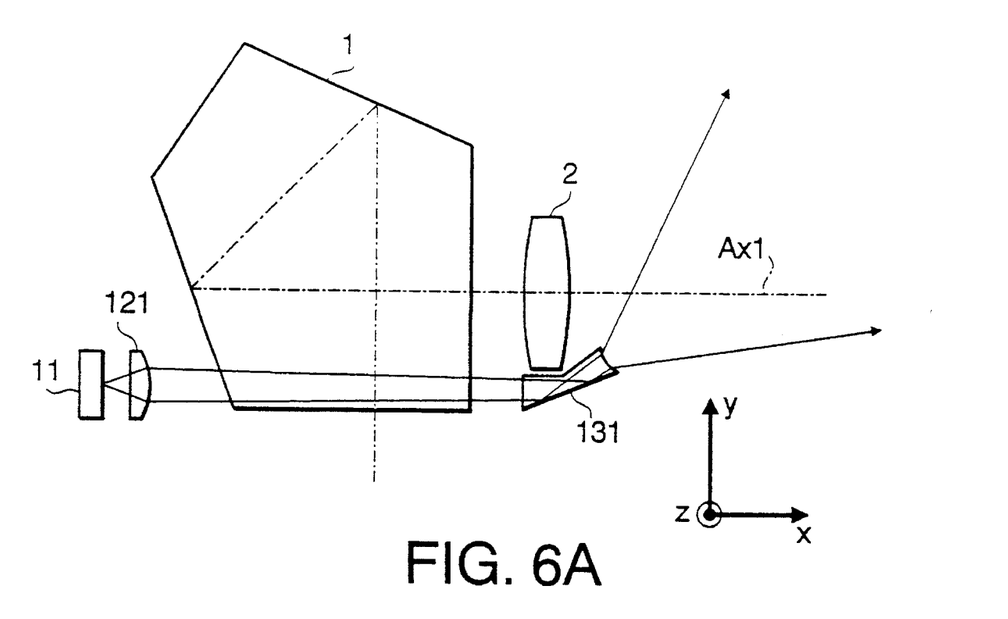
FIG. 6A is a side view of a second embodiment of an eye detection apparatus according to the invention.
Figure 6B:
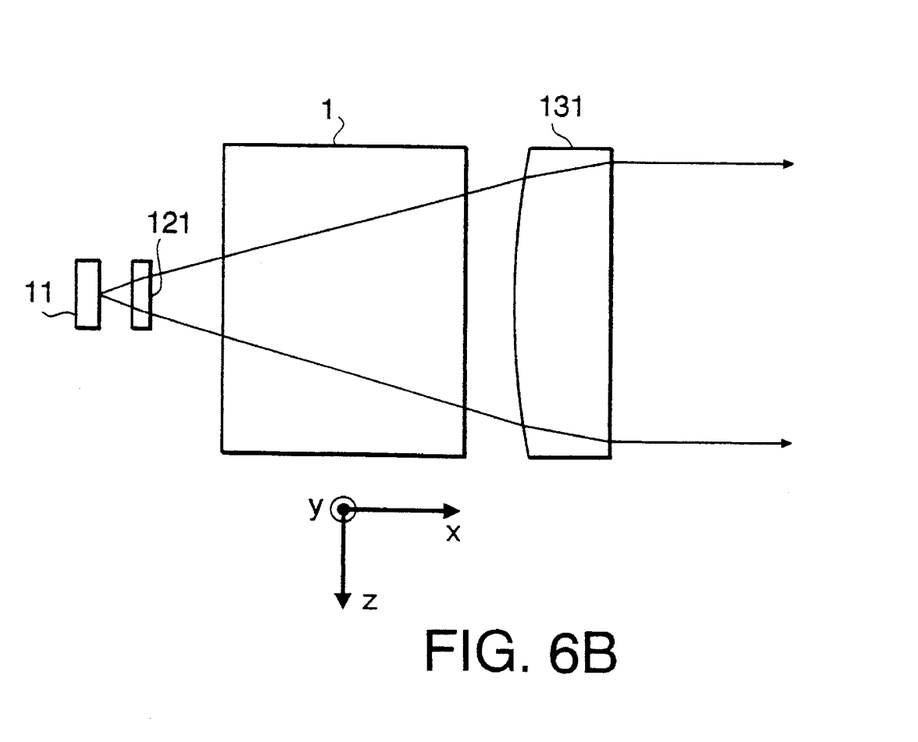
FIG. 6B is a top view of the second embodiment of an eye detection apparatus according to the invention.

FIGS. 6A and 6B, then 7A and 7B, followed by 8A and 8B show light projection systems according to second, third, and fourth embodiments, respectively, of the eye direction detecting device according to the invention. In any of the embodiments, the light projection range of the illumination light is the same as in the first embodiment. However, in order to simplify explanation, the light receiving systems of the embodiments are not shown, but are identical to that shown for the first embodiment.

The second embodiment of the eye direction detection device according to the invention is shown in a side view in FIG. 6A, and in a top view in FIG. 6B. As shown in FIGS. 6A and 6B, the LED 11 and a light projecting lens 121 are provided on an opposite side of the pentaprism 1 from the eyepiece lens 2 in the optical axis Ax1 direction. Illumination light passes through the light projecting lens 121 and is modified into a beam substantially parallel (i.e., concentrated) in the X-Y plane, but largely unaffected in the X-Z plane. The beam, having passed the pentaprism 1, is modified by a light projection prism 131 into a beam substantially parallel in the X-Z plane, dispersed in the X-Y plane, and directed toward the optical axis Ax1 at the ideal position of a user's eye E (not shown) corresponding to the exit pupil of the observing optical system. The light projecting prism 13 is similar to that described in the first embodiment. The light projecting lens 121 is a cylindrical lens having positive power only in the X-Y plane, and the light projecting prism 131 has negative power in the X-Y plane, and positive power in the X-Z plane.

Figure 7A:
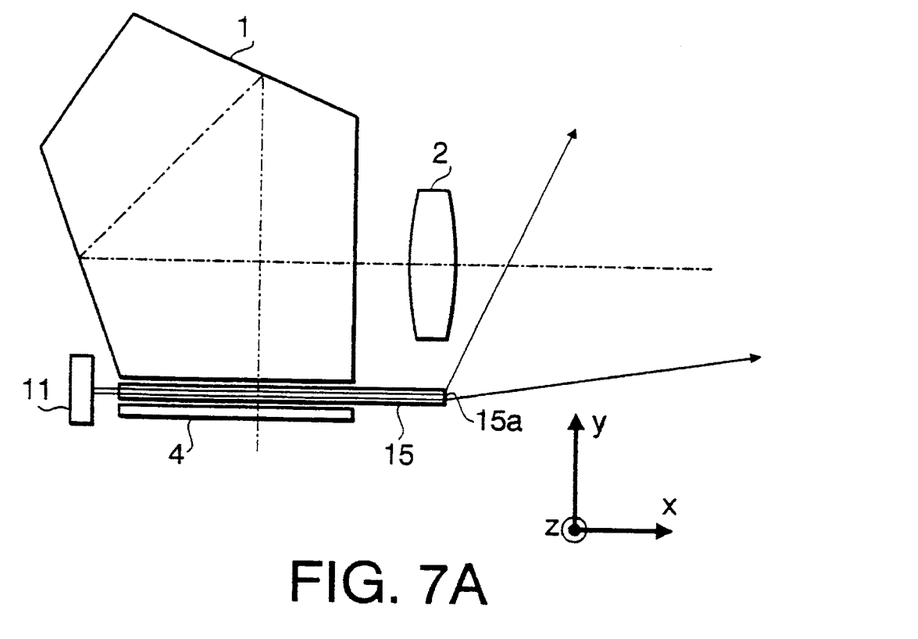
FIG. 7A is a side view of a third embodiment of an eye detection apparatus according to the invention.
Figure 7B:
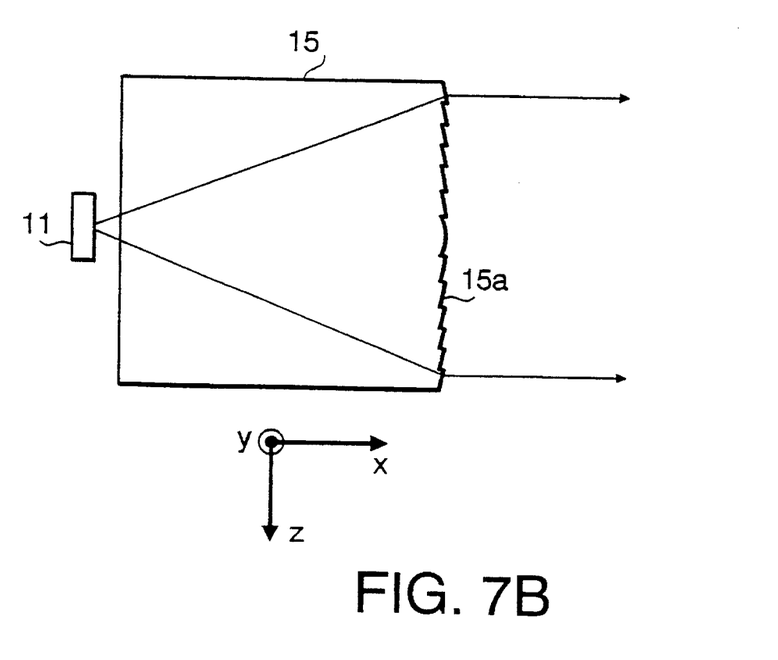
FIG. 7B is a top view of the third embodiment of an eye detection apparatus according to the invention.

The third embodiment of the eye direction detection device according to the invention is shown in a side view in FIG. 7A, and in a top view in FIG. 7B. As shown in FIGS. 7A and 7B, the LED 11 is provided on the opposite side of the pentaprism 1 from the eyepiece lens 2 in the optical axis Ax1 direction. The light generated by the LED 11 is transmitted inside a transparent plate 15 arranged between the pentaprism 1 and a focusing screen 4, guiding the illumination light in a direction parallel to the optical axis Ax1 toward the illumination light exit surface 15a. The illumination light exit surface 15a of the transparent plate 15 is obliquely angled toward the lower side to generate a prism effect that directs a dispersed luminous flux upwardly in the X-Y plane toward the optical axis Ax1. The illumination light exit surface 15a is a Fresnel cylindrical surface having positive power in the X-Z plane. Accordingly, the projection optical system generates a beam dispersed in the X-Y plane, substantially parallel in the X-Z plane, and directed toward the optical axis Ax1 of the finder 100, toward an ideal position of the user's eye E (not shown), corresponding to the exit pupil of the observing optical system.

Figure 8A:
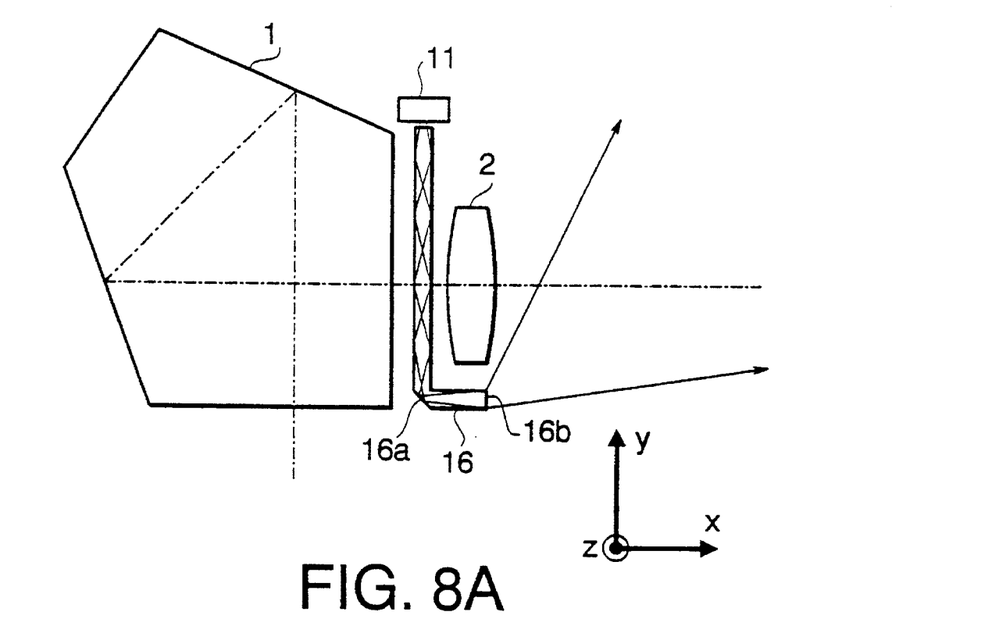
FIG. 8A is a side view of a fourth embodiment of an eye detection apparatus according to the invention.
Figure 8B:
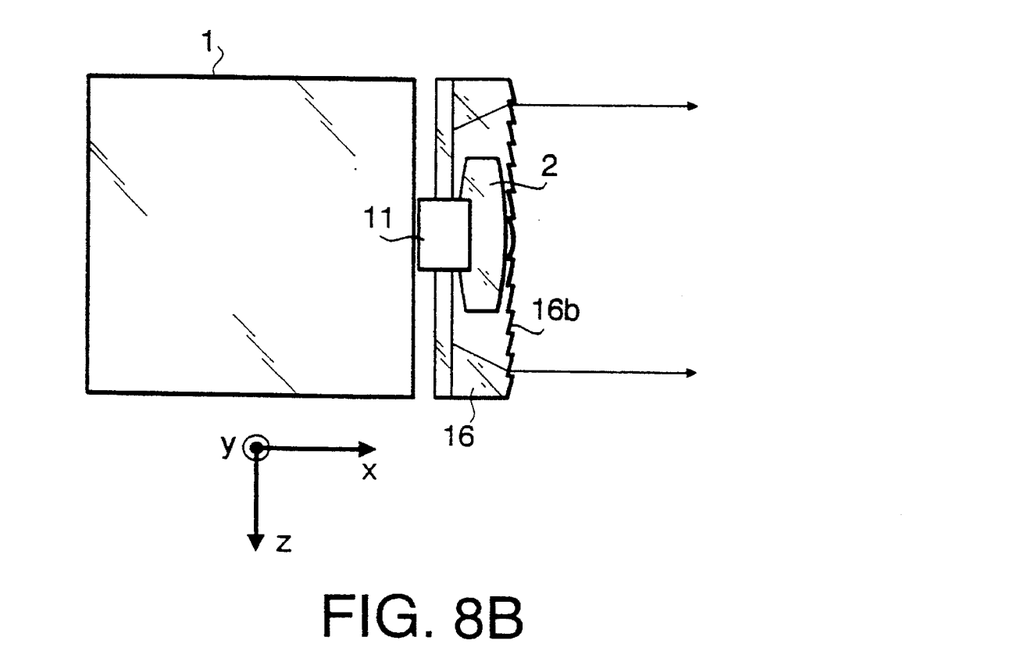
FIG. 8B is a top view of the fourth embodiment of an eye detection apparatus according to the invention.

The fourth embodiment of the eye direction detection device according to the invention is shown in a side view in FIG. 8A, and in a top view in FIG. 8B. As shown in FIGS. 8A and 8B, the LED 11 is arranged at the upper side of the eyepiece lens 2, and an L-shaped transparent plate prism 16 is arranged between the pentaprism 1 and the eyepiece lens 2, extending to the lower side of the eyepiece lens 2, guiding the illumination light in a direction perpendicular to the optical axis Ax1. A reflection surface 16a inside the transparent plate prism 16 redirects the beam to a portion of the transparent plate prism 16 substantially parallel to the optical axis Ax1 of the finder 100, toward the illumination light exit surface 15a. The illumination light exit surface 16b of the transparent plate prism 16 is obliquely angled toward the lower side to generate a prism effect that directs a dispersed luminous flux upwardly in the X-Y plane toward the optical axis Ax1. The illumination light exit surface 16a is a Fresnel cylindrical surface having positive power in the X-Z plane. Accordingly, again the projection optical system generates a beam dispersed in the X-Y plane, substantially parallel in the X-Z plane, and directed toward the optical axis Ax1 of the finder 100, toward an ideal position of the user's eye E (not shown) corresponding to the exit pupil of the observing optical system.

According to the embodiments of the invention, illumination light is projected from a position away from the optical axis of the observing optical system. Even when the user wears eyeglasses, the eye direction can be precisely detected. Furthermore, by employing anamorphically modified illumination light, the light of the light source is concentrated in the detection area, and can therefore be effectively utilized.

The present disclosure relates to subject matter contained in Japanese Patent Application No. HEI 04-153868, filed on May 29, 1995, which is expressly incorporated herein by reference in its entirety.

What is claimed is:

1. An eye direction detection device for an observing optical system, comprising:

a light source;

an anamorphic light projection optical system that anamorphically modifies illumination light from said light source and projects said anamorphically modified illumination light from a position away from an optical axis of the observing optical system;

a light receiving device that receives reflected light from an eye of a user and outputs a signal corresponding to a light distribution of said reflected light; and a calculation unit that determines a gazing direction of the eye in response to said signal output by said light receiving device.

2. The eye direction detection device according to claim 1, wherein said anamorphic light projection optical system projects said anamorphically modified illumination light from a lower eyelid side of the eye, and wherein said anamorphic light projection optical system modifies said illumination light from said light source to be substantially parallel in a lateral direction of the eye, and to be dispersed toward said optical axis in a vertical direction of the eye.

3. The eye direction detection device according to claim 1, wherein said anamorphic light projection optical system modifies said illumination light from said light source to be substantially parallel in a first direction, and to be dispersed toward said optical axis in a second direction perpendicular to said first direction, and wherein said light receiving device detects an eye gazing direction in said first direction within the observing optical system.

4. The eye direction detection device according to claim 1, wherein said anamorphic light projection system comprises:

an anamorphic light projection lens for modifying illumination light from said light source into illumination light parallel in a first direction and dispersed in a second direction perpendicular to said first direction; and an anamorphic light projection prism for reflecting said illumination light from said anamorphic light projection lens toward said optical axis of said observing optical system, and for modifying said illumination light from said anamorphic light projection lens into anamorphically modified illumination light dispersed in said first direction and parallel in said second direction.

5. The eye direction detection device according to claim 4, wherein said anamorphic light projection prism includes at least one Fresnel lens surface for modifying said illumination light from said anamorphic light projection lens.

6. The eye direction detection device according to claim 1, wherein said anamorphic light projection system comprises:

a cylindrical lens for modifying illumination light from said light source into illumination light parallel in a first direction; and an anamorphic light projection prism for reflecting said illumination light from said cylindrical lens toward said optical axis of the observing optical system, and for modifying said illumination light from said cylindrical lens into anamorphically modified illumination light dispersed in said first direction and parallel in said second direction.

7. The eye direction detection device according to claim 6, wherein said anamorphic light projection prism includes at least one Fresnel lens surface for modifying said illumination light from said cylindrical lens.

8. The eye direction detection device according to claim 1, wherein said anamorphic light projection system comprises:

an anamorphic light projection prism for redirecting said illumination light from said light source toward said optical axis of said observing optical system, and for modifying said illumination light from said light source into anamorphically modified illumination light dispersed in a first direction and parallel in a second direction perpendicular to said first direction.

9. The eye direction detection device according to claim 8, wherein said anamorphic light projection prism includes at least one Fresnel lens surface for modifying said illumination light from said light source.

10. The eye direction detection device according to claim 8, wherein an illumination light exit surface of said anamorphic light projection prism is angled to redirect illumination light from said light source toward said optical axis of the observing optical system.

11. The eye direction detection device according to claim 10, wherein said illumination light exit surface comprises a Fresnel lens surface.

12. The eye direction detection device according to claim 10, wherein said anamorphic light projection prism includes a transparent plate guiding said illumination light in a direction parallel to said optical axis toward said illumination light exit surface.

13. The eye direction detection device according to claim 10, wherein said anamorphic light projection prism includes:

a transparent plate guiding said illumination light in a direction perpendicular to said optical axis; and a reflection surface for redirecting said illumination light in a direction parallel to said optical axis toward said illumination light exit surface.

14. A finder system for a camera, comprising:

an observing optical system having an optical axis and an exit pupil at which an eye of a user is positioned when the user looks through said finder system;

a light source;

an anamorphic light projection optical system that anamorphically modifies illumination light from said light source and projects said anamorphically modified illumination light from a position away from said optical axis of said observing optical system toward said optical axis and toward said exit pupil;

a light receiving device that receives reflected light from the eye and outputs a signal corresponding to a light distribution of said reflected light; and a calculation unit that determines a gazing direction of the eye in response to said signal output by said light receiving device.

15. The finder system according to claim 14, further comprising:

a rectangular finder window through which the user looks, and wherein said anamorphic light projection optical system projects said anamorphically modified illumination light from a lower side of said finder window, and wherein said anamorphic light projection optical system modifies said illumination light from said light source to be substantially parallel in a lateral direction of the eye, and to be dispersed toward said optical axis in a vertical direction of the eye.

16. The finder system according to claim 15, wherein said anamorphic light projection optical system modifies said illumination light dispersed toward said optical axis to be substantially centered on said exit pupil at which the eye of the user is positioned when the user looks through said finder system.

17. The finder system according to claim 15, wherein said anamorphic light projection system is provided with a rectangular light projection window having a longitudinal edge parallel to a longitudinal edge direction of said finder window, and wherein said anamorphically modified illumination light is projected through said light projection window.

18. The finder system according to claim 14, wherein said anamorphic light projection system comprises:

an anamorphic light projection lens for modifying illumination light from said light source into illumination light parallel in a first direction and dispersed in a second direction perpendicular to said first direction; and an anamorphic light projection prism for reflecting said illumination light from said anamorphic light projection lens toward said optical axis of said observing optical system, and for modifying said illumination light from said anamorphic light projection lens into anamorphically modified illumination light dispersed in said first direction and parallel in said second direction.

19. The finder system according to claim 18, wherein said anamorphic light projection prism modifies said illumination light dispersed in said first direction to be directed toward said optical axis and to be substantially centered on said exit pupil at which the eye of the user is positioned when the user looks through said finder system.

20. The finder system according to claim 18, wherein said anamorphic light projection prism includes at least one Fresnel lens surface for modifying said illumination light from said anamorphic light projection lens.

21. The finder system according to claim 18, further comprising:

a rectangular finder window through which a user looks, and wherein said anamorphic light projection system projects said anamorphically modified illumination light from a lower side of said finder window, and wherein said anamorphic light projection optical system modifies said illumination light from said light source to be substantially parallel in a lateral direction of the eye, and to be dispersed toward said optical axis in a vertical direction of the eye.

22. The finder system according to claim 14, wherein said anamorphic light projection system comprises:

a cylindrical lens for modifying illumination light from said light source into illumination light parallel in a first direction; and an anamorphic light projection prism for reflecting said illumination light from said cylindrical lens toward said optical axis of said observing optical system, and for modifying said illumination light from said cylindrical lens into anamorphically modified illumination light dispersed in said first direction and parallel in said second direction.

23. The finder system according to claim 22, wherein said anamorphic light projection prism modifies said illumination light dispersed in said first direction to be directed toward said optical axis and to be substantially centered on said exit pupil at which the eye of the user is positioned when the user looks through said finder system.

24. The finder system according to claim 22, wherein said anamorphic light projection prism includes at least one Fresnel lens surface for modifying said illumination light from said cylindrical lens.

25. The finder system according to claim 22, further comprising:

a rectangular finder window through which a user looks, and wherein said anamorphic light projection optical system projects said anamorphically modified illumination light from a lower side of said finder window, and wherein said anamorphic light projection optical system modifies said illumination light from said light source to be substantially parallel in a lateral direction of the eye, and to be dispersed toward said optical axis in a vertical direction of the eye.

26. The finder system according to claim 14, wherein said anamorphic light projection optical system comprises:

an anamorphic light projection prism for redirecting said illumination light from said light source toward said optical axis of said observing optical system, and for modifying said illumination light from said light source into anamorphically modified illumination light dispersed in a first direction and parallel in a second direction perpendicular to said first direction.

27. The finder system according to claim 26, wherein said anamorphic light projection prism modifies said illumination light dispersed in said first direction to be directed toward said optical axis and to be substantially centered on said exit pupil at which the eye of the user is positioned when the user looks through said finder system.

28. The finder system according to claim 26, wherein said anamorphic light projection prism includes at least one Fresnel lens surface for modifying said illumination light from said light source.

29. The finder system according to claim 26, wherein an illumination light exit surface of said anamorphic light projection prism is angled to redirect illumination light from said light source toward said optical axis of said observing optical system.

30. The finder system according to claim 29, wherein the illumination light exit surface comprises a Fresnel lens surface.

31. The finder system according to claim 29, further comprising:

a rectangular finder window through which a user looks, and wherein said anamorphic light projection optical system projects said anamorphically modified illumination light from a lower side of said finder window, and wherein said illumination light exit surface includes a rectangular light projection window having a longitudinal edge parallel to a longitudinal direction of said finder window.

32. The finder system according to claim 29, wherein said anamorphic light projection prism includes a transparent plate guiding said illumination light in a direction parallel to said optical axis toward said illumination light exit surface.

33. The finder system according to claim 29, wherein said anamorphic light projection prism includes:

a transparent plate guiding said illumination light in a direction perpendicular to said optical axis; and a reflection surface for redirecting said illumination light in a direction parallel to said optical axis toward said illumination light exit surface.

* * * * *

UNITED STATES PATENT AND TRADEMARK OFFICE
CERTIFICATE OF CORRECTION

PATENT NO. : 5,608,489
DATED : March 4, 1997
INVENTOR(S) : Hiroyasu OZAKI

It is certified that error appears in the above-indentified patent and that said Letters Patent is hereby corrected as shown below:

At column 15, line 2 (claim 30, line 2, change "the" to ---said---.

Signed and Sealed this

Twentieth Day of May, 1997

*Attest:*

BRUCE LEHMAN

*Attesting Officer*     *Commissioner of Patents and Trademarks*